United States Patent [19]

Schulz et al.

[11] Patent Number: 4,585,846

[45] Date of Patent: Apr. 29, 1986

[54] CYCLOPOLYMERIZABLE SULFOBETAINE MONOMER

[75] Inventors: Donald N. Schulz, Annandale; Jeffrey J. Kaladas, South Bound Brook, both of N.J.

[73] Assignee: Exxon Research and Engineering Co., Florham Park, N.J.

[21] Appl. No.: 688,243

[22] Filed: Jan. 2, 1985

[51] Int. Cl.$^4$ ................................................ C08F 4/00
[52] U.S. Cl. .................................... 526/264; 526/287; 526/303.1; 526/307.3
[58] Field of Search ..................... 526/264, 287, 303.1, 526/307.3

[56] References Cited

U.S. PATENT DOCUMENTS 4,030,987  6/1977  Fujita et al. ...................... 204/55 R

FOREIGN PATENT DOCUMENTS 54005096  1/1979  Japan .

OTHER PUBLICATIONS

Butler [J. Am. Chem. Soc. 79 3128(1957)].
Galin [Polymer 25 121,254 (1984)].

Primary Examiner—Joseph L. Schofer
Assistant Examiner—J. M. Reddick
Attorney, Agent, or Firm—Richard E. Nanfeldt

[57] ABSTRACT

The present invention relates to homopolymers and copolymers of N-(4-sulfoalkyl)N-methyldiallyl ammonium betaines which are useful as aqueous viscosification agents.

3 Claims, No Drawings

CYCLOPOLYMERIZABLE SULFOBETAINE MONOMER

BACKGROUND OF THE INVENTION

The betaines are a special class of zwitterions. These materials are self neutralized and contain no counterions. Moreover, the positive and negative charges are separated by alkyl groups.

Saturated nonpolymerizable betaines are well known in the detergent and fiber fields. Both carbonyl and sulfo-saturated betaine compounds are claimed in such patents as U.S. Pat. Nos. 3,649,677; 4,088,612; 3,539,521; and 4,381,980.

Polymerizable monounsaturated carboxy betaine monomers, e.g., carboxymethacrylate betaine monomers (I) and polymers (II) are well-known and disclosed in U.S. Pat. No. 2,777,872 (Jan. 15, 1957), U.S. Pat. No. 2,834,758 (May 13, 1958) and U.S. Pat. No. 2,846,417 (Aug. 5, 1958).

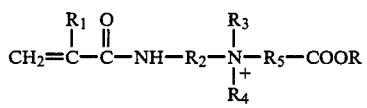

Carboxyvinylpyridine betaine monomers and homopolymers (II) have also been reported [H. Ladenheim and H. Morawetz, J. Poly. Sci. 26, 251 (1957)].

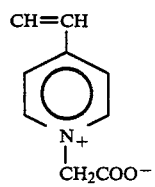

Polymerizable monounsaturates sulfoalkyl betaine monomers such as:

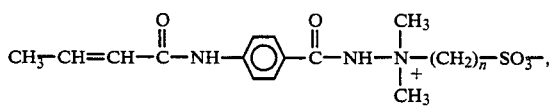

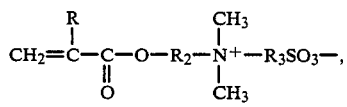

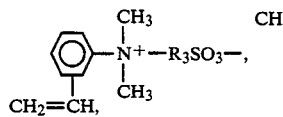

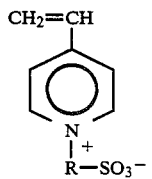

are taught in such patents as U.S. Pat. Nos. 3,547,985, 3,473,998, 3,484,479 and Ger. Auslegeschrift No. 1,207,630, and in such articles as Hart and Timmerman, J. Olym. Sci. 28 118 (1958) and Galin Polymer 25 121,254.

Cyclopolymerizable alkyl quaternary ammonium salts, e.g.,

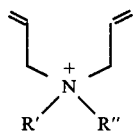

wherein R' and R" are alkyl groups, are described in the article by Butler [J. Am. Chem. Soc. 79 3128 (1957)].

Cyclopolymerizable N-carbomethoxymethyl-N-alkyl-N-N-diallyl ammonium chloride,

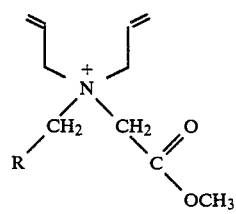

is described in Eur. Pat. Ep No. 55,048 (June 30, 1982). The above monomer cyclopolymerizes to form polymers of the type,

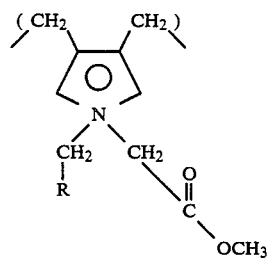

These polymers in turn, can be hydrolyzed to form cyclo carboxy betaine polymers

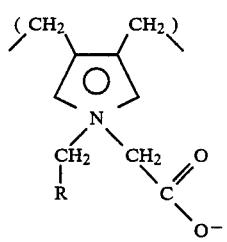

where are useful as antimicrobial polymers.

N-Na carboxylate-N-methyl-N-N-dialkyl ammonium betaine monomer is disclosed in U.S. Pat. No. 2,935,495 by the reaction of N-methyl-N-N-diallylamine with the sodium salt of bromoacetic acid. However, the preparation of this monomer requires mixed solvents and several steps (i.e., preneutralization of the bromoacid reaction with the tertiary amine and extraction with benzene) and mixed solvents (H2O/acetone).

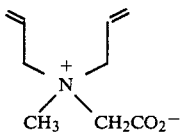

SUMMARY OF THE INVENTION

The instant invention describes a novel cyclopolymerizable N-(4-sulfoalkyl) N-methyldiallyl ammonium betaine monomer,

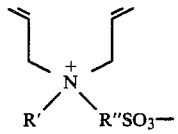

wherein R' is an alkyl group of 1-20 carbon atoms and wherein R" is an alkyl group having about 3 to about 4 carbon atoms.

The instant monomer differs from the saturated non-polymerizable betaine art because the instant monomer is homo-and copolymerizable. The instant monomer differs from the other monounsaturated betaine monomers because it is diunsaturated and forms rings on polymerization. It also has no hydrolyzable weak links, like amides or esters.

The instant invention is distinct from Butler's diallyl cyclopolymerizable quaternary ammonium salts because the instant diallylic monomer is dipolar or zwitterionic and is less salt and pH-sensitive than the Butler compounds.

The present invention also differs from the cyclopolymerizable N-carbomethoxymethyl-N-N-diallyl ammonium chloride of Eur. Pat. EP No. 55,048 (June 30, 1982) because the present invention copolymerizes directly to a betaine cyclopolymer without the need of an ester intermediate. Also, the instant invention leads to cyclic sulfobetaines and not cyclic carboxybetaines; it is generally known that sulfonated products are more stable than carboxylated products.

The instant invention is superior to that of U.S. Pat. No. 2,935,493 both in product and process. The present product is a sulfobetaine which is expected to show improved stability, and it is prepared in a one-step process in a single solvent.

The present invention also relates to unique and novel betaine, homopolymers and copolymers of N-(4-sulfoalkyl) N-methyldiallylamine ammonium betaine (MDABS). Such materials contain both positive and negative charges.

The present homo- and copolymers are distinguished from the carboxymethacrylate betaine homopolymers and copolymers (U.S. Pat. Nos. 2,777,872, 2,834,758, 2,846,417) because sulfonate vs. carboxylate anions and low vs. high charge densities are used. Furthermore, carboxylate anions are limited by their known susceptibility to precipitation by polyvalent cations (e.g., $Ca^{++}$); the latter species are often found in geological formations [F. J. Glaris in "Water Soluble Resins" 2nd Ed., R. L. Davidson and M. Sittig, Eds. Rheinhold, NY, p. 168]. Sulfonate anions are not so limited.

The present invention is distinguished from the previous sulfobetaine homo- and copolymers in the following ways: different structures, and higher thermal stabilities as measured by $T_6A$.

GENERAL DESCRIPTION OF THE INVENTION

The present invention relates to a method for increasing the viscosity of an aqueous solution which comprises the step of dissolving about 0.1 to about 5.0 wt% of a water soluble betaine homopolymer-copolymer in the aqueous solution, wherein the aqueous solution is selected from the group consisting of water, a brine solution, an acid solution or a base solution, wherein the concentration of the salt, acid or brine in the aqueous solution is about 0.01 to about 5.0 wt%.

The viscosifying agents for aqueous and saline solutions of the present invention are betaine copolymers formed by a homogeneous, free radical, copolymerization, wherein the N(4-sulfoalkyl) N-methyldilalyl ammonium betaine monomer is polymerized with itself or copolymerized with acrylamie o N-vinylpyrrolidone m onomer, wherein the mole percent of the betaine unit is about 1 to about 99 mole percent, more preferably 20 to 80, and most preferably 30 to 70.

The N-(4-sulfobutyl) N-methyldiallyl amine ammonium betaine monomer has the formula:

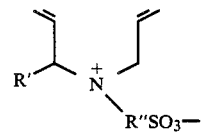

wherein R' is an alkyl group of about 1 to about 20 carbon atoms and R" is an alkyl group having about 3 to about 4 carbon atoms.

The viscosities of aqueous solutions of these homopolymers and copolymers were measured by means of a Contraves ® low shear viscometer model LS30 using a No. 1 cup and No. 1 bob. Temperatures were controlled to ±1° C., and measurements were made at a rotational speed that gave a shear rate of 1.28 $s^{-1}$.

The homogeneous polymerization process of the instant invention comprises the steps of forming a mixture of betaine monomer and optionally a comonomer and either water or a brine solution to form a reaction solution; heating said reaction solution to at least 50° C.; adding a free radical initiator to said reaction solution to initiate the homopolymerization or copolymerization of the comonomer and the N-(4-sulfobutyl)-N-methyldiallylmine ammonium betaine monomer; polymerizing the monomers at a sufficient temperature and for a sufficient time to form the water soluble homopolymer or copolymer of N-C4-sulfobutyl/N-methyldiallyl ammonium betaine monomer; and recovering the water soluble homo- or copolymer from the reaction solution. The specific details of polymerization are set forth in the Examples herein.

Suitable free radical initiators for the instant free radical-copolymerization process are potassium or ammonium persulfate; sodium thiosulfate, potassium persulfate mixture; benzoyl peroxide, AIBN and modified AIBN and other common free radical initiators. The concentration of the free radical initiator is about 0.02 to about 0.50 grams per 100 grams of total monomer.

Polymerization of the acrylamide monomer or N-vinylpyrrolidone and N-(4-sulfobutyl)N-methyldiallyl ammonium betaine monomer, or homopolymerization of the betaine monomer is effective at a temperature of about 25° to about 90° C., more preferably at about 30° to about 65° C., and most preferably at about 45° to about 55° C. for a period of about 1 to about 48 hours, more preferably at about 2 to about 36, and most preferably at about 4 to about 24. A suitable method for recovery of the formed copolymer from the reaction solution comprises precipitation by means of a non-solvent, such as acetone.

The N-(4-sulfobutyl)N-methyldiallyl ammonium betaine monomer is prepared by forming an acetone solution under a nitrogen blanket of N-methyldiallamine and butane sulfate and heating the solution with stirring to 50° C. for about 48 hours. The reaction solution is cooled to 25° C. and the precipitate of the N-(4-sulfobutyl)N-methyldiallyl betaine monomer is recovered by filtration. The 4-(4-sulfobutyl)N-methyldiallyl ammonium betaine monomer can be polymerized by subjecting the monomer to a free radical initiator such as potassium persulfate at about 50° C. for about 23 hours under a nitrogen blanket to form the polymer, poly N-(4-sulfobutyl)N-methyldiallyl ammonium betaine.

DESCRIPTION OF THE PREFERRED EMBODIMENTS

The following examples illustrate the present invention without, however, limiting the same hereto.

EXAMPLE 1

Prep N-(4-Sulfobutyl)N-Methyldiallylamine ammonium betaine (MDABS)

The sulfobutylation of N-methyldiallylamine was carried out in a all glass reaction vessel equipped with a water cooled condenser, thermometer, stirrer, addition funnel and nitrogen inlet.

A solution of 1 mole of freshly distilled N-methyldiallylamine (Virginia Chemicals) in acetone was added to the reaction vessel. While the batch was stirring a solution of distilled butaine sultone (Aldrich) in acetone was added until solution was homogeneous, then the solution was heated to 50° C. with stirring under nitrogen for 48 hr. The reaction was cooled to 25° C. and the M-DABS monomer was recovered as a precipitate by filtration. The precipitate was washed thoroughly with acetone and vacuum dried at 25° C. The MDABS monomer was purified by recrystallization from isopropanol.

Initial yield 35% Final 30% (after recry). M.P. 115° C.

The product showed ionic sulfonate bands in the IR at 1180–1210 cm$^{-1}$ and 1040 cm$^{-1}$, as well as nonconjugated olefin (—C=C—) at 1645 cm$^{-1}$.

Theoretical elemental analysis: C=53.42%; H=8.56%, N=5.66; S=12.96. Found elemental analysis: C—53.03%; H=8.67%; N=5.32; S=13.16.

Yields between 80–90% are possible using toluene as solvent and at a higher reaction temperature.

EXAMPLE 2

Prep. Poly(N-(4-sulfobutyl)N-methyldiallylamine Ammonium Betaine) Poly(MDABS)

A 100 ml all glass reaction vessel was equipped with a magnetic stir bar, thermometer, nitrogen inlet and water cooled condenser. Add 40 g dist. water and deoxygenate by heating at 50° C. for 1 hr. while stirring with a rapid nitrogen purge. A 10 g quantity MDABS monomer was dissolved and a 1 g quantity (44%) postassium persulfate soln. stirred and heated was added. The batch was under a nitrogen blanket for 23 hr. Afterward the batch was cooled to 25° C. and precipitated into hot isopropanol, isolated by filtration and vacuum dried at 30° C. The polymer is crystalline and has a Tm=142° C. by DSC. The thermal stability of this homopolymer as measured by the onset of major weight loss by TGA(N$_2$) was 370°±25° C. This is considerably higher than the decomposition temperatures of other polybetaines, such as poly [N-(3 sulfopropyl)-N-methacroyloxyethyl-N$_9$N-dimethyl-ammonium]betaine, 328°±25° C., and the betaine homopolymer of 2 vinyl pyridine, 305°±25° C.

EXAMPLE 3

Prep. Poly(Acrylamide-co-N-(4-Sulfobutyl)N-methyl Diallylamine Ammonium Betaine) Poly(Am co MDABS)

A 1 liter all glass reaction vessel was equipped with an air driven stir motor, stirrod, thermometer, nitrogen inlet and water cooled condenser. A 365 g quantity of distilled water was added and deoxygenated by heating for 1 hr. at 50° C. while stirring with a rapid nitrogen purge. A 23.5 g quantity of acrylamide+2.1 g MDABS monomer was dissolved and a 1 g quantity (0.90%) potassium persulfate soln. was added. The batch was stirred and heated under a nitrogen blanket for 18.5 hr., cooled to 25° C., precipitated into methanol, isolated by filtration, and vacuum dried at 30° C. The product was found to contain 0.90 mole% betaine by elemental analysis (uncorrected for water) and had a Tg of 92° C. by DSC.

EXAMPLES 4 and 5 (12P, 13P)

Additional Copolymerization of MDABS with AM

The method of Example 3 was repeated except that comonomer charge was valued according to Table 1.

TABLE 1

| Example | Mole % MDABS Charged | Mole % MDABS Incorporated | Brookfield 1.5% Dist. H20 | [η] 2% NaCl |
|---|---|---|---|---|
| 4 (12P) | 5.0 | 1.80 | 850 cp | 6.4 dl/g |
| 5 (13P) | 10.0 | 3.26 | 275 cp | 5.4 dl/g |

EXAMPLE 6

Coppolymerization of M-DAPS with AM

The method of Example 4 was repeated except that the N-(3 sulfopropyl)N-methyldiallylamine (M-DAPS) was substituted for N-(4 sulfobutyl)N-methyldiallylamine ammonium betaine (M-DABS).

Brk. vis. (1.5% in H$_2$O) 75 cp.

EXAMPLE 7

Preparation of Copolymer of MDABS with NVP

A 20.0 g (0.08 mol) quantity of MDABS and a 8.98 g (0.08 mol) quantity of NVP were dissolved in 150 ml H$_2$O and polymerized with 0.035 g (1.29+10$^{-r}$ mol) of an azo initiator (V-50) at 60° C. for one week. After this time, 100% yield of product was isolated.

What is claimed is:

1. A water soluble copolymer of N-(4-sulfoalkyl)N-methyldiallyl ammonium betaine and N-vinyl pyrrolidone wherein said N-(4-sulfoalkyl)N-methyldiallyl ammonium betaine has the formula:

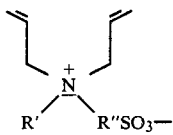
wherein R' is an alkyl group having about 1 to about 20 carbon atoms and R" is an alkyl group having about 3 to about 4 carbon atoms.
2. A copolymer of N-(4-sulfoalkyl)N-methyldiallyl ammonium betaine and acrylamide.
3. A polymer of N-(4-sulfoalkyl)N-methyldiallyl ammonium betaine.
* * * * *